United States Patent [19]
Driessen

[11] Patent Number: 5,113,979
[45] Date of Patent: May 19, 1992

[54] BASE VALVE FOR A SHOCK ABSORBER

[75] Inventor: Jan Driessen, Hasselt, Belgium

[73] Assignee: Monroe Auto Equipment Company, Monroe, Mich.

[21] Appl. No.: 658,321

[22] Filed: Feb. 30, 1991

[51] Int. Cl.⁵ .................................................. F16F 9/50
[52] U.S. Cl. .................................. 188/280; 188/314; 188/322.14
[58] Field of Search .................... 188/314, 315, 322.14, 188/280, 285

[56] References Cited

U.S. PATENT DOCUMENTS

| | | | |
|---|---|---|---|
| 3,341,189 | 9/1967 | Rumsey | 188/314 X |
| 3,470,986 | 10/1969 | Whisler, Jr. | 188/314 X |
| 3,827,537 | 8/1974 | Haller, Jr. et al. | 188/280 X |
| 4,356,898 | 11/1982 | Guzder et al. | 188/280 |
| 4,623,049 | 11/1986 | Warren | 188/314 X |
| 4,832,162 | 5/1989 | Bacardit | 188/322.14 X |
| 4,971,180 | 11/1990 | Kobayashi et al. | 188/315 X |
| 4,972,928 | 11/1990 | Sirven | 188/322.14 X |

FOREIGN PATENT DOCUMENTS 0229310 7/1987 European Pat. Off. ....... 188/322.14

Primary Examiner—Joseph F. Peters, Jr.
Assistant Examiner—Carla Mattix
Attorney, Agent, or Firm—Harness, Dickey & Pierce

[57] ABSTRACT

A shock absorber for damping the relative movement of the sprung portion of the automobile with respect to the unsprung portion of the automobile. The shock absorber includes a pressure cylinder and a piston disposed within the pressure cylinder. The piston is able to control the flow of damping fluid between the first and second portions of the working chamber so as to generate firm and soft damping characteristics. The shock absorber also includes a reserve cylinder disposed exterior of the pressure cylinder, and a base valve disposed at one end of the pressure cylinder. The base valve is operable to control the flow of damping fluid between the second portion of the working chamber and the reserve chamber in response to the flow of damping fluid between the first and second portions of the working chamber.

29 Claims, 3 Drawing Sheets

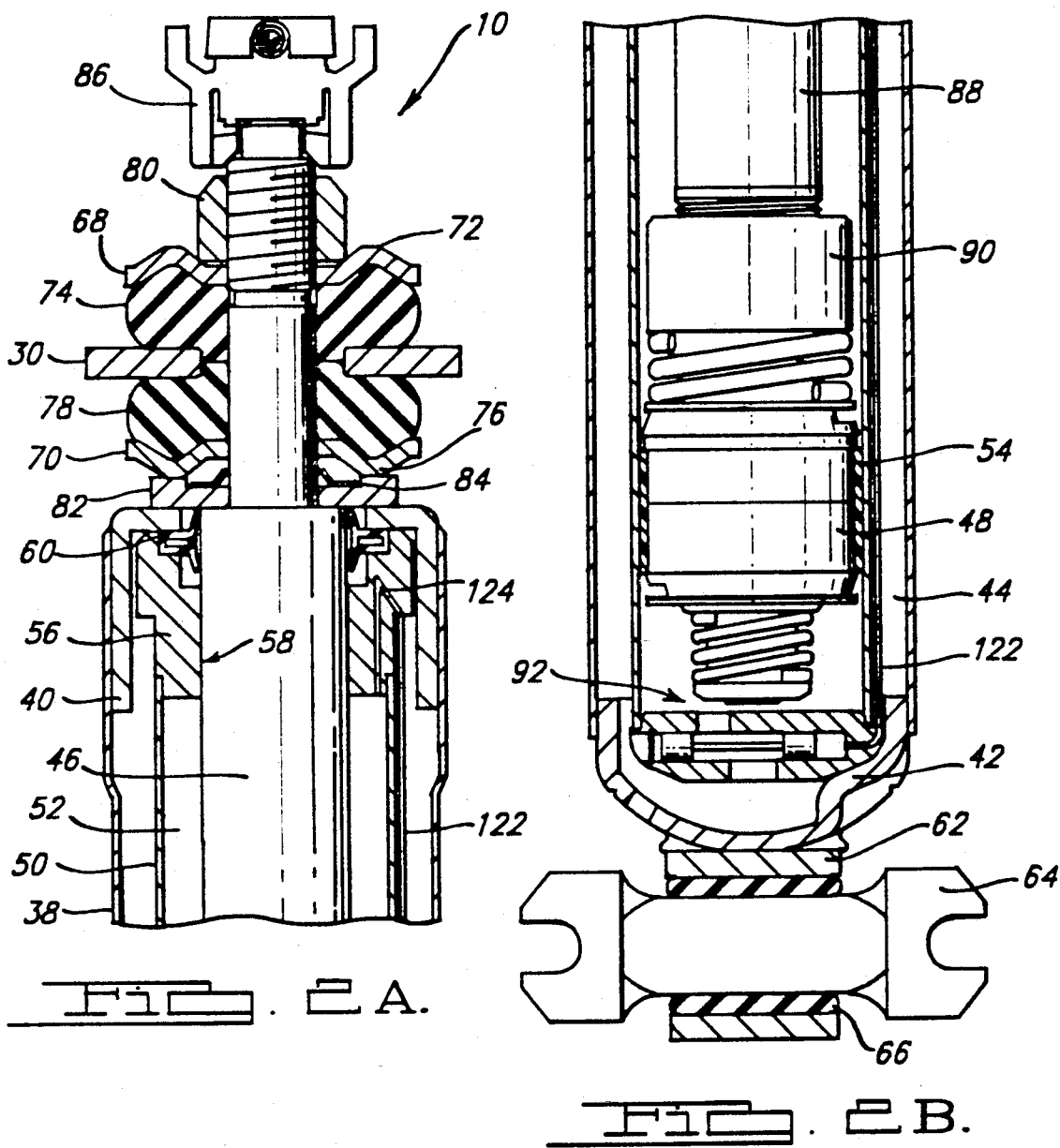
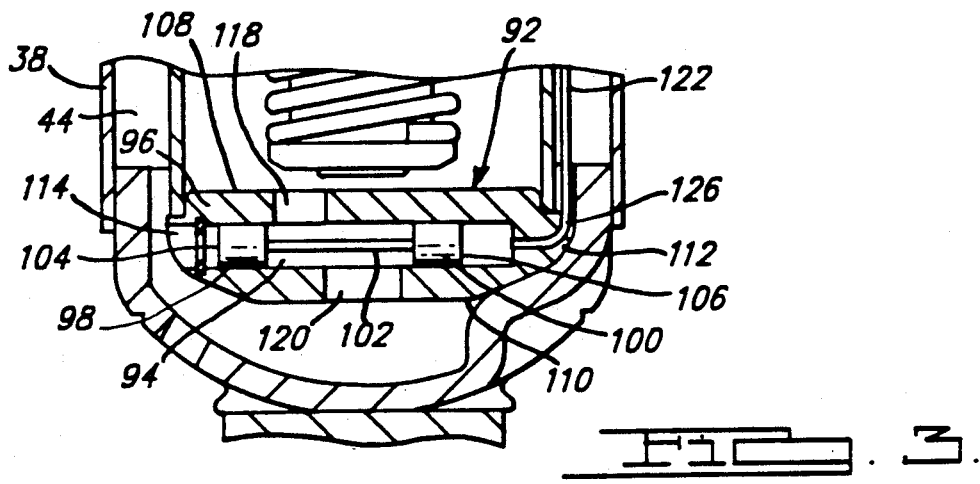

5,113,979

BASE VALVE FOR A SHOCK ABSORBER

BACKGROUND OF THE INVENTION

1. Field of the Invention

This invention relates to suspension systems for automobiles as well as machines which receive mechanical shock, and more particularly to a base valve for a shock absorber.

2. Description of Related Art

Shock absorbers are used in connection with automotive suspension systems to absorb unwanted vibrations which occur during driving. To dampen unwanted vibrations, shock absorbers are generally connected between the body and the suspension of the automobile. A piston assembly is located within the shock absorber and is connected to the body of the automobile through a piston rod. Because the piston assembly is able to limit the flow of damping fluid within the working chamber of the shock absorber when the shock absorber is compressed or extended, the shock absorber is able to provide a damping force which "smooths" or "dampens" vibrations transmitted from the suspension to the body. The greater the degree to which the flow of damping fluid within the working chamber is restricted by the piston assembly, the greater the damping forces which are generated by the shock absorber.

Because the amount of damping forces the shock absorber generates causes variation in driving characteristics, it is often desirable to have a shock absorber in which the amount of damping forces generated by the shock absorber is adjustable. One method for selectively changing the damping characteristics of a shock absorber is disclosed in PCT International Publication No. WO 88/06983. This reference discloses a shock absorber which has a solenoid for controlling the flow of damping fluid into pressure chambers which are located adjacent to valve disks which control the damping characteristics of the shock absorber. Upon movement of the plunger of the solenoid, the pressure in these pressure chambers changes so that the damping characteristics of the shock absorber may be varied.

Another method for selectively changing the damping characteristics of the shock absorber is disclosed in U.S. Pat. No. 5,016,908 reference, the plunger of a solenoid extends into the body of the piston and is used to control the flow of damping fluid through flow paths which lead to two unloaders which are able to bias upper and lower spring disks. By controlling the flow of damping fluid through these flow paths, it is possible to vary the damping forces generated by the shock absorber.

Shock absorbers which are used to provide variable damping often have a base valve which controls the flow of damping fluid between the lower portion of the working chamber and the reserve chamber which surrounds the pressure cylinder in which the piston is located. While such base valves generally serve their intended purpose of controlling the flow of damping fluid between the reserved chamber and the working chamber, they often do not adjust the flow of damping fluid in response to the desired damping characteristics which the shock absorber is to provide. In other words, these base valves would typically allow approximately the same amount of damping fluid to flow between the lower portion of the working chamber and the reserved chamber regardless of whether the shock absorber was to provide firm damping or soft damping.

SUMMARY OF THE INVENTION

Accordingly, it is the primary object of the present invention to provide a base valve which is able to vary the flow of damping fluid between the lower portion of the working chamber and the reserve chamber in response to the damping characteristics generated by the shock absorber. In this regard, a related object of the present invention is to provide a base valve which continuously adjusts itself so as to improve the control of damping forces provided by the piston of the shock absorber.

Another object of the present invention is to provide a base valve which is able to control the flow of damping fluid chamber in response to the pressure differential between the damping fluid in the first portion of the working chamber and the damping fluid in the reserve chamber.

A further object of the present invention is to provide a base valve which is able to reduce the amount of aeration caused when the pressure of the damping fluid in the first portion of the working chamber is less than the pressure of the damping fluid in the reserve chamber.

Another object of the present invention is to provide a base valve which is able to improve the control of damping forces which are provided by a variable damping shock absorber.

A further object of the present invention is to provide a base valve of relatively simple construction for use with a variable damping shock absorber. In this regard, a related object of the present invention is to provide a base valve for a shock absorber which is relatively inexpensive and relatively easy to manufacture.

BRIEF DESCRIPTION OF THE DRAWINGS

Other objects of the present invention will become apparent to one skilled in the art upon reading the following specification and by reference to the following drawings in which:

FIGS. 2A and 2B is the schematic representation of the shock absorber shown in FIG. 1 using the base valve according to the teachings of the preferred embodiment of the present invention;

FIG. 3 is a cross-sectional view of the base valve shown in FIG. 2B according to the teachings of the preferred embodiment of the present invention;

DESCRIPTION OF THE PREFERRED EMBODIMENT

Figure 1:
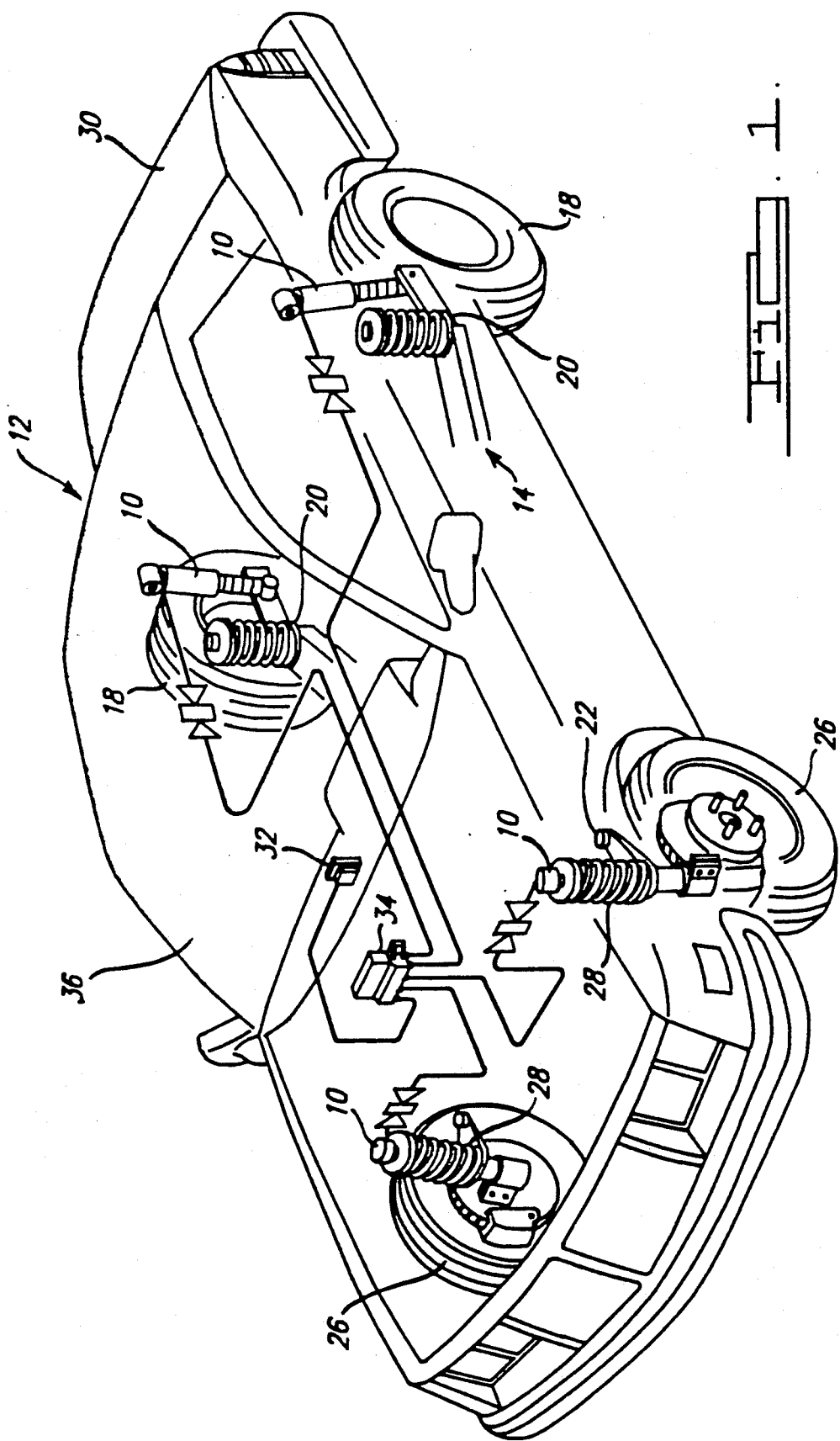
FIG. 1 is an illustration of an automobile using the base valve according to the teachings of the preferred embodiment of the present invention.

Referring to FIG. 1, a plurality of four shock absorbers 10 according to the preferred embodiment of the present invention are shown. The shock absorbers 10 are depicted in operative association with a diagrammatic representation of a conventional automobile 12. The automobile 12 includes a rear suspension system 14 having a transversely extending rear axle assembly (not shown) adapted to operatively support the vehicle's rear wheels 18. The rear axle assembly is operatively connected to the automobile 12 by means of a pair of shock absorbers 10 as well as by the helical coil springs 20. Similarly, the automobile 12 has a front suspension system 22 including a transversely extending front axle assembly (not shown) to operatively support the front wheels 26. Front axle assembly is operatively connected to the automobile 12 by means of a second pair of shock absorbers 10 and by the helical coil springs 28.

The shock absorbers 10 serve to damp the relative movement of the unsprung portion (i.e., the front and rear suspension systems 22 and 14) and the sprung portion (i.e., the body 30) of the automobile 12. While the automobile 12 has been depicted as a passenger car, the shock absorber 10 may be used with other types of automotive vehicles or in other types of applications and suspension systems. Further, the term "shock absorber" as used herein will refer to shock absorbers in the general sense of the phrase and will include MacPherson struts.

To allow the damping characteristics of the shock absorbers 10 to be controlled, a mode select switch 32 and an electronic control module 34 are provided. The mode select switch 32 is located within the passenger compartment 36 of the automobile 12 and is accessible by the occupants of the automobile 12. The mode select switch 32 is used for selecting which type of damping characteristics the shock absorbers 10 are to provide (i.e., firm, soft or automatic). The electronic control module 34 receives the output from the mode select switch 32 and is used for generating electronic control signals for controlling damping characteristics of the shock absorbers 10. While the electronic control module 34 may be of the type described in U.S. Pat. No. 5,016,908 filed Mar. 13, 1989, other suitable electronic control modules may be used. By controlling the damping characteristics of the shock absorbers 10, the shock absorbers 10 are able to dampen relative movement between the body 30 and the suspension of the automobile 12 in such a manner as to optimize both ride comfort and road handling ability simultaneously.

The structure of the shock absorbers 10 will now be described with reference to FIGS. 2A and B. The shock absorber 10 comprises an elongated reserve cylinder 38 which engages a cup-shaped oil cap 40 at the upper end of the reserve cylinder 38. The reserve cylinder 38 also engages a base cup 42 at the lower end of the reserve cylinder 38 so as to form a reserve chamber 44 which is able to store damping fluid. Extending axially through the oil cap 40 is a piston rod 46 which is secured to a reciprocating piston assembly 48 at the lower end of the piston rod 46. The piston assembly 48 is axially displaceable within an elongated tubular pressure cylinder 50 which is disposed within the reserve cylinder 38. The pressure cylinder 50 defines a working chamber 52 in which the upper or first portion of the working chamber 52 is located above the piston assembly 48, while the lower or second portion of the working chamber 52 is located below the piston assembly 48. Disposed between the piston assembly 48 and the pressure cylinder 50 is a teflon sleeve 54 which is used to facilitate movement of the piston assembly 48 with respect to pressure cylinder 50.

A piston assembly 48 is used to provide variable damping forces which tend to optimize the driving characteristics of the automobile. The piston assembly 48 is able to provide variable damping forces by controlling the flow of damping fluid between the upper portion of the working chamber and the lower portion of the working chamber during both compression and rebound. The structure and operation of one piston assembly which is able to provide variable damping shown in U.S. Pat. No. 5,016,908 filed Mar. 13, 1989, which is hereby incorporated by reference. However, other suitable piston assembly structures may be used.

To support the piston rod within the pressure cylinder 50, the shock absorber 10 further comprises an annular rod guide 56. The rod guide 56 is disposed between the upper portion of the pressure cylinder 50 and the oil cap 40 and has an aperture 58 which is sufficiently large to accommodate the piston rod 46. The rod guide 56 thereby permits axial movement of the piston rod 46 while preventing lateral movement of the piston rod 46. Disposed between the rod guide 56 and the oil cap 40 is a rubber or plastic seal 60. The seal 60 is secured in a recess formed in the upper surface of the rod guide 56 and sealingly engages the exterior surface of the piston rod 46. The seal 60 is therefore able to prevent dirt and foreign matter from entering the working interior of the shock absorber 10.

To connect the shock absorber 10 to the rear axle assembly of the automobile 12, the shock absorber 10 comprises a circular end fitting 62. The circular end fitting 62 is secured to the base cup 42 of the shock absorber 10 by a suitable means such as welding. Within the circular end fitting is disposed a mounting pin 64 disposed within a bushing 66 which is adapted to engage the axle assembly of the automobile 12. To connect the shock absorber 10 to the body 30 of the automobile 12, a first retainer 68 and a second retainer 70 are provided. The first retainer 68 and the second retainer 70 are disk shaped and have a central aperture operable to receive the piston rod 46. The first retainer 68 is disposed above the body 30, while the second retainer 70 is disposed below the body 30. The first retainer 68 has a downwardly facing annular indentation 72 which is able to accommodate a first disk-shaped cushion 74 which is disposed between the body 30 of the automobile 12 and the first retainer 68. Similarly, the second retainer 70 has an upwardly facing annular indentation 76 which is operable to receive a second disk-shaped cushion 78 which is disposed between the body 30 of the automobile 12 and the second retainer 70.

The shock absorber 10 further comprises a self-locking nut 80 which is disposed on the piston rod 46 immediately above the first retainer 68. The self-locking nut 80 has an internally threaded bore which is able to threadably engage the threaded upper end portion of the piston rod 46. Accordingly, by rotating the self-locking nut 80 on the upper portion of the piston rod 46, both the first retainer 68 and the first cushion 74 are displaced in a direction toward the body 30 of the automobile 12.

The second retainer 70 is positionally secured in part by means of an annular spacer 82 which is disposed immediately above the oil cap 40. The spacer 82 has a central bore which is able to receive the upper end portion of the piston rod 46. A pal nut 84 is disposed between the second retainer 70 and the spacer 82. The pal nut 84 is generally disk shaped and has a central bore which is able to receive the piston rod 46. The pal nut 84 is used to locate and secure the spacer 82.

To permit electrical communication between the electronic control module 34 and the shock absorber 10, the shock absorber 10 further comprises an electrical connector assembly 86. The electrical connector assembly 86 allows for rapid electrical decoupling of the shock absorber 10 from the electronic control module 34 so that the shock absorber 10 may be replaced. The electrical connector assembly 86 may be of the type which is shown in FIGS. 8-10 of U.S. Pat. No. 4,846,318, though other suitable electrical connectors may be used.

To support the piston assembly 48 on the piston rod 46, an axially extending piston post 88 and a piston post rod nut 90 are provided. The piston post 88 is generally circular in cross-section and extends axially through the central bore (not shown) of the piston assembly 48. The piston post 88 is secured to the piston rod 46 by the piston post rod nut 90. The piston post rod nut 90 is annularly shaped and comprises an internally threaded bore which is able to mate with the externally threaded lower portion of the piston rod 46.

Figure 4:
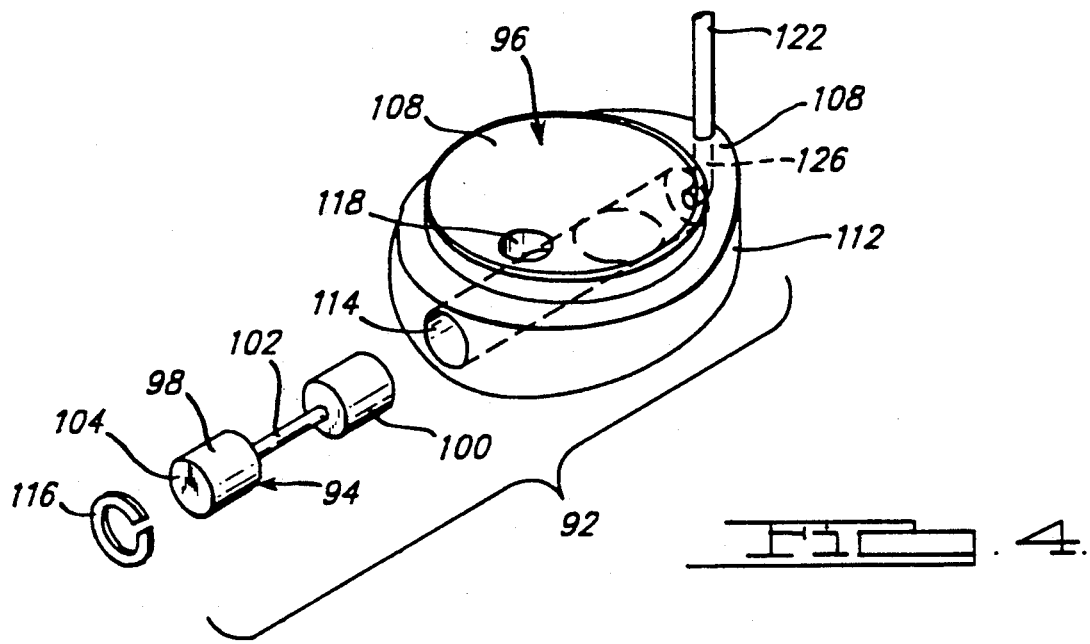
FIG. 4 is an exploded view of the base valve shown in FIG. 3 according to the teachings of the preferred embodiment of the present invention.

To provide means for controlling the flow of damping fluid between the second portion of the working chamber and the reserved chamber in response to the flow of damping fluid controlled by the piston assembly 48, a base valve 92 is provided. As shown in FIG. 4, the base valve 92 includes a valve element 94 which is slidably disposed within a valve housing 96. The valve element 92 comprises two cylindrical members 98 and 100 which are disposed on either end of an axial member 102, with the cylindrical members 98 and 100 and the axial element 102 being disposed coaxially with respect to each other. The cylindrical member 98 has a surface 104 upon which the pressure of the damping fluid in the reserve chamber 44 acts as described below. Similarly, the cylindrical element 100 also has a surface 106 upon which the pressure of damping fluid in the upper portion of the working chamber 52 acts as well. While the valve element 94 may be formed of hardened steel, other suitable materials may also be used. Furthermore, the valve element 94 may be made of other suitable shapes and may include seals which limit the flow of damping fluid between the cylindrical members 98 and 100 and the valve housing 96.

The valve housing 96 comprises a substantially circular upper surface 108 which is secured to the lower portion of the pressure cylinder 50 by a suitable means such as by a press fit. In addition, the valve housing 96 has a substantially circular lower surface 110 which is disposed below the substantially circular upper surface 108 at a position displaced therefrom. To connect the upper surface 108 and the lower surface 110 of the valve housing 96, the valve housing 96 further comprises a substantially cylindrical surface 112. The substantially cylindrical surface 112 extends from the lower surface 110 of the valve housing 96 to the upper surface 108 of the valve housing 96.

To allow the valve element 94 to be slidably disposed within the valve housing 96, the valve housing 96 comprises a first bore 114. The first bore 114 extends from the cylindrical surface 112 of the valve housing 96 partially through the valve housing 96 in a direction parallel to the substantially circular upper and lower surfaces 108 and 110. The first bore 114 has sufficient diameter so as to accommodate the valve element 94 and is open to the reserve chamber 44 so that damping fluid in the reserve chamber 44 can act on the surface 104 of the cylindrical element 98. Disposed within the first bore 114 adjacent to the open end of the first bore 114 is a snap ring 116. The snap ring 116 is used to secure the valve element 94 within the first bore 114.

Figure 5A:
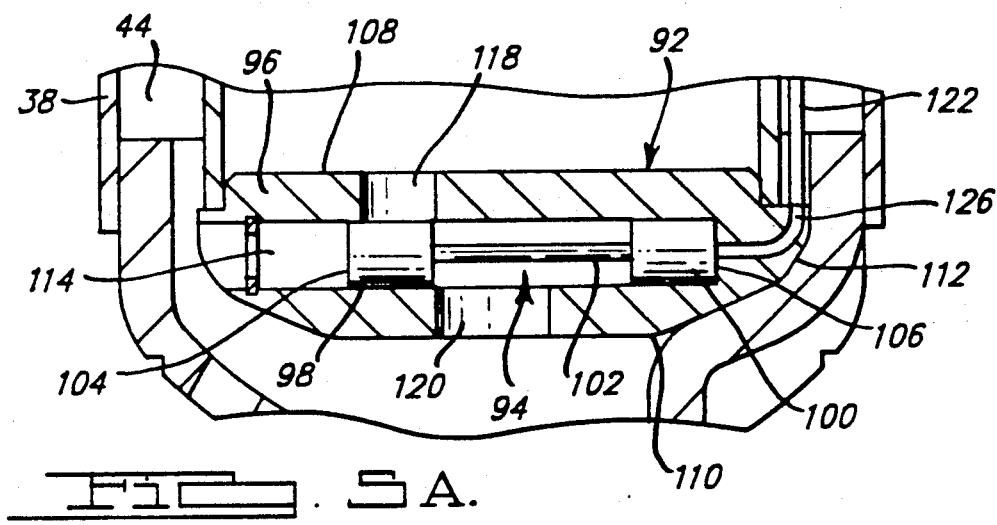
FIGS. 5A and 5B are cross-sectional views of the base valve shown in FIG. 2B in its open and closed positions according to the teachings of the preferred embodiment of the present invention.
Figure 5B:
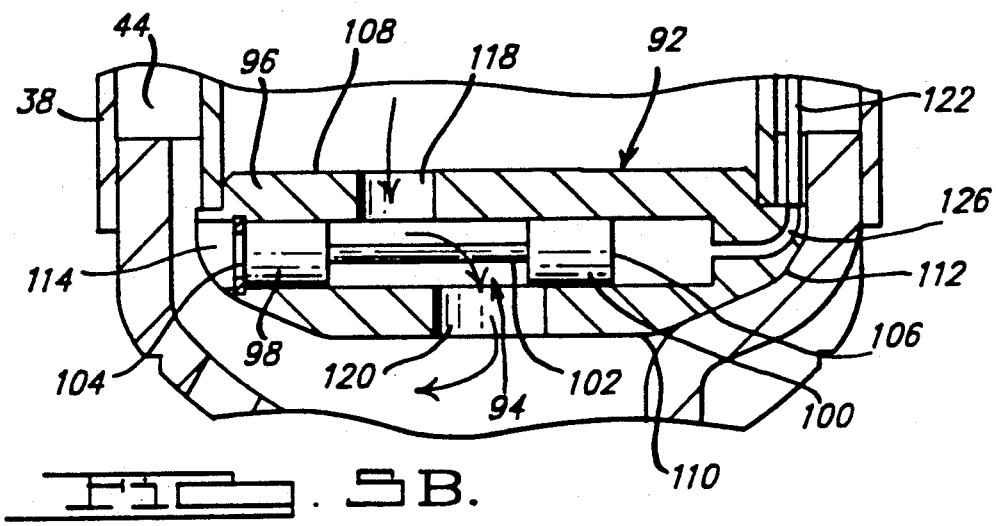

To allow the valve element 94 to control the flow of damping fluid between the second portion of the working chamber 52 and the reserve chamber 44, the valve housing 96 further comprises a second bore 118 and a third bore 120. The second bore 118 extends from the substantially circular upper surface 108 in a downward direction to the first bore 114, while the third bore 120 extends in an upward direction from the substantially circular lower surface 110 to the first bore 114. As more fully discussed below, the second bore 118 and the third bore 120 are oriented on the valve housing 96 such that movement of the valve element 94 in one direction (e.g., to the right as shown in FIG. 5A) will obstruct the flow of damping fluid through the second bore 118, while movement of the valve element 94 in another direction (i.e., to the left as shown in FIG. 5B) will cause the valve element 94 to be located at a position within the valve housing 96 which does not obstruct the flow of damping fluid through the second bore 118. When the valve element 94 is not obstructing the second bore 118, the base valve 92 permits substantially unrestricted flow of damping fluid from the lower portion of the working chamber 52 to the reserve chamber 44 through the second bore 118 and the third bore 112.

To allow the base valve 92 to respond to the pressure of damping fluid in the first portion of the working chamber 52, an annular tube 122 is provided. The annular tube 122 is disposed vertically in the region between the pressure cylinder 50 and the reserve cylinder 38. The upper end of the annular tube 122 is connected to the rod guide 56 disposed at the upper end of the pressure cylinder 50. Furthermore, the upper end of the annular tube 122 fluidly communicates with the upper portion of the working chamber 52 through a rod guide flow passage 124 which is disposed in the rod guide 56. The rod guide flow passage 124 allows damping fluid in the upper portion of the working chamber 52 to fluidly communicate with the annular tube 122. Accordingly, the annular tube 122 is able to receive damping fluid from the upper portion of the working chamber 52 through the rod guide flow passage 124.

The lower end of the annular tube 122 is connected to the substantially circular upper surface 108 of the base valve 92. Furthermore, the annular tube 122 fluidly communicates with the first bore 114 through a fourth bore 126 which is disposed in the valve element 94. The upper portion of the fourth bore 126 extends in a downward direction coaxially with the axial centerline of the annular tube 122 while the lower portion of the fourth bore 126 extends coaxially with the first bore 114 of the base valve 92. Accordingly, the first bore 114 of the base valve 92 is able to receive damping fluid from the upper portion of the working chamber 52 through the rod guide flow passage 124, the annular tube 122, and the fourth bore 126 of the base valve 92.

The method of operation of the base valve 92 will now be described. Damping fluid from the upper portion of the working chamber 52 is delivered to the surface 106 of the cylindrical member 100 of the valve element 94 through the rod guide flow passage 124, the annular tube 122, as well as the fourth bore 126 in the valve housing 96. Accordingly, the pressure of the damping fluid in the upper portion of the working chamber 52 exerts a force on the surface 106 of the cylindrical element 100 which tends to displace the valve element 94 in a direction towards the left as shown in FIGS. 5A and B.

In addition, damping fluid from the reserve chamber 44 is delivered to the surface 104 of the cylindrical member 98 of the valve element 94 through the first bore 114. Accordingly, the pressure of the damping fluid in the reserve chamber 44 exerts a force on the first cylindrical element 98 which tends to force the valve element 94 towards the right as shown in FIGS. 5A and B. The valve element 94 is therefore able to regulate the flow of damping fluid between the second portion of the working chamber 52 and the reserve chamber 44 in response to the pressure of the damping fluid in the first portion of the working chamber 52 in the following manner.

When the pressure of the damping fluid in the first portion of the working chamber 52 begins to decrease with respect to the pressure of the damping fluid in the reserve chamber 44 during compression, the valve element 94 begins to move towards the right as shown in FIG. 5A to such a position so as to restrict the flow of damping fluid through the second bore 118. When the flow of damping fluid is obstructed in this manner, the pressure of the damping fluid in the first portion of the working chamber 52 increases. When the damping fluid in the upper portion of the working chamber 52 begins to exceed the pressure of the damping fluid in the reserve chamber 44 during compression, the valve element 94 moves towards the left as shown in FIG. 5B so as to allow damping fluid to flow through the second bore 118 and third bore 120 of the valve housing 96 which permits damping fluid to flow substantially unrestricted between the second portion of the working chamber 52 and the reserve chamber 44.

When the shock absorber is in rebound, the pressure of the damping fluid inside the upper portion of the working chamber 52 increases with respect to the pressure of the damping fluid in the reserve chamber 44 thereby causing the valve element 94 to move to the left as shown in FIG. 5B. Damping fluid is therefore able to flow relatively unrestricted between the reserve chamber 44 and the lower portion of the working chamber 52 during rebound.

It will be understood by those skilled in the art that the base valve will restrict the flow of damping fluid between the lower portion of the working chamber and the reserve chamber during firm damping while permitting relatively unrestricted flow during soft damping. Furthermore, because the pressure of the damping fluid in the first portion of the working chamber is substantially greater than or equal to the pressure of the damping fluid in the reserve chamber, aeration of the damping fluid is minimized. In addition, it will be appreciated that the present invention is susceptible to modification, variation and change. For example, a spring disposed in the first bore may be used to bias the valve element in a position to obstruct the flow of damping fluid through the first bore. It is therefore to be understood that within the scope of the appended claims, the invention may be practiced otherwise than specifically described.

What is claimed is:

1. A shock absorber for damping the relative movement between the sprung and unsprung portions of an automobile, said shock absorber being able to provide compression and rebound strokes, said shock absorber comprising:

a pressure cylinder forming a working chamber;

a piston disposed in said pressure cylinder operable to divide said working chamber into first and second portions, said piston having first means for controlling the flow of damping fluid between said first and second portions of said pressure cylinder, said first means being able to selectively generate firm and soft damping characteristics;

a reserve cylinder disposed exteriorly of said pressure cylinder, said reserve cylinder cooperating with said pressure cylinder so as to form a reserve chamber; and second means for controlling the flow of damping fluid between said second portion of said working chamber and said reserve chamber in response to the flow of damping fluid between said first and second portions of said working chamber controlling by said first means, said second means for controlling the flow of damping fluid between said second portion of said working chamber and said reserve chamber including a valve housing and a valve element slidably disposed within said valve housing.

2. A shock absorber according to claim 1, wherein said second means for controlling the flow of damping fluid is responsive to the pressure of damping fluid in said first portion of said working chamber.

3. A shock absorber according to claim 1, wherein said second means for controlling the flow of damping fluid comprises a first flow passage fluidly communicating with said first portion of said working chamber.

4. The shock absorber of claim 3, wherein said second means for controlling the flow of damping fluid comprises a second flow passage fluidly communicating with said second portion of said working chamber.

5. A shock absorber according to claim 4, wherein said second means for controlling the flow of damping fluid comprises a third flow passage fluidly communicating with said reserve chamber.

6. A shock absorber according to claim 1, wherein said second means for controlling the flow of damping fluid is further operable to cause the pressure of damping fluid in said first portion of said working chamber to be greater than or equal to the pressure of damping fluid in said reserve chamber during compression of said shock absorber.

7. A shock absorber according to claim 1, wherein said second means for controlling the flow of damping fluid is further operable to reduce aeration of said damping fluid in said shock absorber.

8. A shock absorber according to claim 1, wherein said second means for controlling the flow of damping fluid being further operable to permit substantially unrestricted flow of damping fluid between said reserve chamber and said second portion of said damping chamber during rebound of said shock absorber.

9. A shock absorber according to claim 1, wherein said second means for controlling the flow of damping fluid being further operable to restrict the flow of damping fluid from said second portion of said working chamber to said reserve chamber when said first means for controlling the flow of damping fluid is operable to cause firm damping during compression of said shock absorber.

10. The shock absorber according to claim 9, wherein said second means for controlling the flow of damping fluid is further operable to cause substantially unrestricted flow of damping fluid between said second portion of said working chamber and said reserve chamber when said first means for controlling the flow of damping fluid causes soft damping during compression of said shock absorber.

11. A shock absorber for damping the relative movement of the sprung portion of an automobile with respect to the unsprung portion of the automobile, said shock absorber comprising:
a pressure cylinder forming a working chamber;
a piston disposed within said pressure cylinder operable to divide said working chamber into first and second portions, said piston operable to control the flow of damping fluid between said first and second portions of the working chamber so as to generate firm and soft damping characteristics;
a reserve cylinder disposed exteriorly of said pressure cylinder, said reserve cylinder cooperating with said pressure cylinder so as to form a reserve chamber; and
a base valve disposed proximate to one end of the pressure cylinder, said base valve being operable to control the flow of damping fluid between the second portion of the working chamber and the reserve chamber in response to the flow of damping fluid between said first and second portions of said working chamber, said base valve including a valve housing and a valve element slidably disposed within said valve housing.

12. A shock absorber according to claim 11, wherein the base valve comprises a first flow passage fluidly communicating with said first portion of said working chamber, a second flow passage fluidly communicating with said second portion of said working chamber and a third flow passage fluidly communicating with said reserve chamber.

13. A shock absorber according to claim 12, wherein said base valve further comprises means for restricting the flow of damping fluid through said second and third flow passages.

14. A shock absorber according to claim 13, wherein said valve element comprises two cylindrical members which are connected with an axial member, each of said cylindrical members and said axial element being disposed coaxially with respect to each other.

15. A shock absorber according to claim 14, wherein said first cylindrical member includes a circular surface and said second cylindrical member includes a circular surface, the damping fluid in said reserve chamber being operable to exert pressure on said circular surface of said first cylindrical member and the damping fluid in said first portion of said working chamber operable to exert pressure on said circular surface of said second cylindrical member.

16. A shock absorber according to claim 15, wherein said first cylindrical member is able to restrict the flow of damping fluid through said second flow passage when the pressure of the damping fluid exerted on said circular surface of said first cylindrical member exceeds the pressure of damping fluid exerted on the circular surface of said second cylindrical member.

17. A shock absorber according to claim 16, wherein said valve housing has a first substantially circular surface and a second substantially circular surface, said first substantially circular surface being parallel to said second substantially circular surface.

18. A shock absorber according to claim 17, wherein said valve housing further comprises a substantially cylindrical surface extending from the perimeter of said first substantially cylindrical surface to said second substantially cylindrical surface.

19. A shock absorber according to claim 18, wherein said valve housing further comprises:
(a) a first bore extending into said valve housing from said substantially cylindrical surface at a position substantially parallel to said first and second substantially circular surfaces, said first bore being operable to slidably receive said valve element,
(b) a second bore extending from said first substantially circular surface to said second bore so as to form said second flow passage,
(c) a third bore extending from said second substantially circular surface to said first bore so as to form said third flow passage, and
(d) a fourth bore extending from said first substantially circular surface of said valve housing to said first bore, said fourth bore comprising said first flow passage.

20. A shock absorber according to claim 19, further comprising an annular tube disposed in said reserve chamber and being operable to deliver damping fluid from said first portion of said working chamber to said first bore of said base valve.

21. A shock absorber according to claim 20, further comprising a piston rod for supporting said piston in said pressure cylinder and a piston rod guide for supporting said piston rod, said piston rod guide including a rod guide flow passage fluidly communicating with said first portion of said working chamber and said annular tube.

22. A shock absorber according to claim 21, wherein said annular tube fluidly communicates with said fourth bore in said valve housing.

23. A method for controlling the flow of damping fluid through a base valve of a shock absorber, said sock absorber being able to provide compression and rebound strokes, said shock absorber including:
(a) a pressure cylinder forming a working chamber,
(b) a piston disposed in said pressure cylinder operable to divide said working chamber into first and second portions, said piston having first means for controlling the flow of damping fluid between said first and second portions of said working chamber so as to generate firm and soft damping characteristics,
(c) a reserve cylinder disposed exteriorly of said pressure annular cylinder, said reserve cylinder cooperating with said pressure cylinder so as to form a reserve chamber,
said method comprising the steps of:
delivering damping fluid from said first portion of said working chamber to said base valve;
delivering damping fluid from said reserve chamber to
said base valve; and
regulating the flow of damping fluid flowing between said second portion of said working chamber and said reserve chamber in response to the relative pressure of the damping fluid in said first portion of said working chamber with respect to the pressure of damping fluid in said reserve chamber, said step of regulating the flow of damping fluid including the step of allowing substantially unrestricted flow of damping fluid between said second portion of said working chamber and said reserve chamber when said piston is operable to generate soft damping characteristics during compression of said shock absorber.

24. A method for controlling the flow of damping fluid through a base valve of a shock absorber according to claim 23, wherein said step of regulating the flow of damping fluid comprises the step of restricting the flow of damping fluid from said second portion of said working chamber to said reserve chamber when the pressure of damping fluid in said reserve chamber is equal to or exceeds the pressure of the damping fluid in said first portion of said working chamber.

25. A method for controlling the flow of damping fluid through a base valve of a shock absorber according to claim 23, wherein said step of regulating the flow of damping fluid includes the step of restricting the flow of damping fluid from said second portion of said working chamber to said reserve chamber when said piston is operable to generate firm damping characteristics during compression of said shock absorber.

26. A method for controlling the flow of damping fluid through a base valve of a shock absorber according to claim 25, wherein said step of regulating the flow of damping fluid comprises the step of allowing substantially unrestricted flow of damping fluid between said second portion of said working chamber and said reserve chamber when said shock absorber is in rebound.

27. A method for controlling the flow of damping fluid through a base valve according to claim 23, wherein said step of delivering damping fluid from said first portion of said working chamber to said base valve comprises the step of causing damping fluid in said first portion of said working chamber to be delivered to said base valve through an annular tube disposed in said reserve chamber.

28. A method for controlling the flow of damping fluid through a base valve a shock absorber according to claim 23, wherein said base valve comprises a valve element and a valve housing, said step of regulating the flow of damping fluid comprises the step of displacing said valve element in said valve housing in response to the pressure of damping fluid in said first portion of said working chamber and the pressure of damping fluid in said reserve chamber.

29. A method for controlling the flow of damping fluid through a base valve of a shock absorber according to claim 28, wherein said step of displacing said valve element comprises the steps of:
(a) moving said valve element in a first direction so as to obstruct the flow of damping fluid between the second portion of said working chamber and said reserve chamber when the pressure of damping fluid in said reserve chamber exceeds the pressure of damping fluid in said first portion of said working chamber, and
(b) moving said valve element in a second direction so as to permit substantially unrestricted flow of damping fluid between said second portion of said working chamber and said reserve chamber when the pressure of damping fluid in said first portion of said working chamber exceeds the pressure of damping fluid in said reserve chamber.

* * * * *

UNITED STATES PATENT AND TRADEMARK OFFICE
CERTIFICATE OF CORRECTION

PATENT NO. : 5,113,979
DATED : May 19, 1992
INVENTOR(S) : Jan Driessen

It is certified that error appears in the above-identified patent and that said Letters Patent is hereby corrected as shown below:

ON THE TITLE PAGE, item 22 Filed:
"Feb. 30, 1991" should be --Feb. 20, 1991--.

Column 3, line 37,
"filed March 13, 1989" should be --issued May 21, 1991--.

Column 4, line 7,
"filed March 13, 1989" should be --issued May 21, 1991--.

Signed and Sealed this

Ninth Day of November, 1993

Attest:

BRUCE LEHMAN

Attesting Officer     Commissioner of Patents and Trademarks